(12) United States Patent
Zantout et al.

(10) Patent No.: US 9,831,654 B2
(45) Date of Patent: Nov. 28, 2017

(54) PRE-FILLED SPLICE CONNECTOR

(71) Applicant: IDEAL Industries, Inc., Sycamore, IL (US)

(72) Inventors: Alan Emad Zantout, Sycamore, IL (US); Benjamin David Swedberg, Sycamore, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 0 days.

(21) Appl. No.: 14/817,330

(22) Filed: Aug. 4, 2015

(65) Prior Publication Data

US 2017/0040790 A1    Feb. 9, 2017

(51) Int. Cl.
*H02G 15/04* (2006.01)

(52) U.S. Cl.
CPC .................. *H02G 15/043* (2013.01)

(58) Field of Classification Search
USPC .................................................. 174/87, 84 R
See application file for complete search history.

(56) References Cited

U.S. PATENT DOCUMENTS

| | | | | | |
|---|---|---|---|---|---|
| 2,368,181 | A | * | 1/1945 | Vernet | G01K 5/44 200/83 B |
| 2,890,266 | A | * | 6/1959 | Bollmeier | H01R 4/22 174/87 |
| 3,676,574 | A | * | 7/1972 | Johansson | H01R 4/26 174/138 F |
| 3,783,177 | A | * | 1/1974 | Kelso | H01R 4/22 174/138 F |
| 4,553,809 | A | * | 11/1985 | Holt | H01R 4/024 174/84 R |
| 4,982,054 | A | * | 1/1991 | De Bruycker | H02G 15/076 156/49 |
| 5,151,239 | A | * | 9/1992 | King, Jr. | H01R 4/22 174/87 |
| 5,308,922 | A | * | 5/1994 | Wallace | H01B 3/40 174/87 |
| 5,315,066 | A | * | 5/1994 | Spiteri, Sr. | H01R 4/22 174/87 |
| 5,418,331 | A | * | 5/1995 | Delalle | H01R 4/22 174/74 R |
| 5,427,270 | A |   | 6/1995 | Patterson | |
| 6,025,559 | A |   | 2/2000 | Simmons | |
| RE37,340 | E | * | 8/2001 | King, Jr. | H01R 4/22 174/87 |
| 6,878,880 | B2 | * | 4/2005 | King, Jr. | H01R 4/12 174/87 |
| 7,129,414 | B2 | * | 10/2006 | King, Jr. | H01R 4/12 174/87 |

(Continued)

OTHER PUBLICATIONS

ISA/US, International Search Report and Written Opinion issued on PCT application No. US2016/045186, dated Oct. 28, 2016, 11 pages.

*Primary Examiner* — William H Mayo, III
*Assistant Examiner* — Krystal Robinson
(74) *Attorney, Agent, or Firm* — Greenberg Traurig, LLP

(57) ABSTRACT

A splice connector, such as a twist-on wire connector, is pre-filled with a plurality of compounds arranged in a corresponding plurality of layers. When the twist-on wire connector is applied to the electrical conductors, the compounds will generally remain in the plurality of layers to thereby allow each of the compounds to perform a different, intended function.

9 Claims, 2 Drawing Sheets

(56) References Cited

U.S. PATENT DOCUMENTS

| | | | |
|---|---|---|---|
| 7,368,663 B1 * | 5/2008 | Fisher | .................... H02G 15/04 174/74 R |
| 2002/0050387 A1 | 5/2002 | Blaha et al. | |
| 2004/0104039 A1 | 6/2004 | King, Jr. | |

* cited by examiner

PRE-FILLED SPLICE CONNECTOR

BACKGROUND

Splice connectors, such as twist-on or screw-on wire connectors, are known in the art. Generally, these connectors are used to connect the ends of two or more electrical conductors, such as wires. The connectors typically include a housing formed from an electrically insulating material, such as plastic, in which is disposed an electrical connecting element formed from an electrically conductive material, such as a shaped wire spring. The connecting element is used to bring the ends of the electrical conductors into secured electrical contact with each other.

Pre-filled, twist-on wire connectors are also known in the art. For example, U.S. Pat. No. 2,890,266 and U.S. Pat. No. 7,368,663 each disclose a twist-on wire connector that is pre-filled with an insulating material. The insulating material may be provided with powdered zinc and/or aluminum to improve electrical contact.

Furthermore, U.S. Pat. No. 5,315,066 discloses a twist-on wire connector that is pre-filled with two compounds. The two compounds are separated by a barrier layer that is formed by a reaction at their interface. When the twist-on wire connector is applied to the electrical conductors, the two components are intended to be mixed together to seal the conductors within the connector.

Similarly, U.S. Pat. No. 5,151,239 discloses a twist-on wire connector that is pre-filled with two compounds. The two compounds are separated by a puncturable seal. Again, when the twist-on wire connector is applied to the electrical conductors, the seal is broken and the two components are mixed together to encapsulate the conductors within the connector.

For the sake of brevity in the description which follows, the disclosure within each of the above-noted patents is incorporated herein by reference in its entirety.

SUMMARY

Described hereinafter is a splice connector, in the exemplary form of a twist-on wire connector, which is pre-filled with a plurality of compounds arranged in a corresponding plurality of layers. When the twist-on wire connector is applied to the electrical conductors, the compounds will generally remain in the plurality of layers to thereby allow each of the compounds to perform a different, intended function.

While the foregoing provides a general description of the subject electrical connector and application tools, a better understanding of the objects, advantages, features, properties, and relationships of the subject electrical connector and application tools will be obtained from the following detailed description and accompanying drawings which set forth illustrative embodiments and which are indicative of the various ways in which the principles of the invention claimed hereinafter may be employed.

BRIEF DESCRIPTION OF THE DRAWINGS

For a better understanding of the hereinafter described electrical connector reference may be had to the following drawings in which.

DETAILED DESCRIPTION

Figure 1:
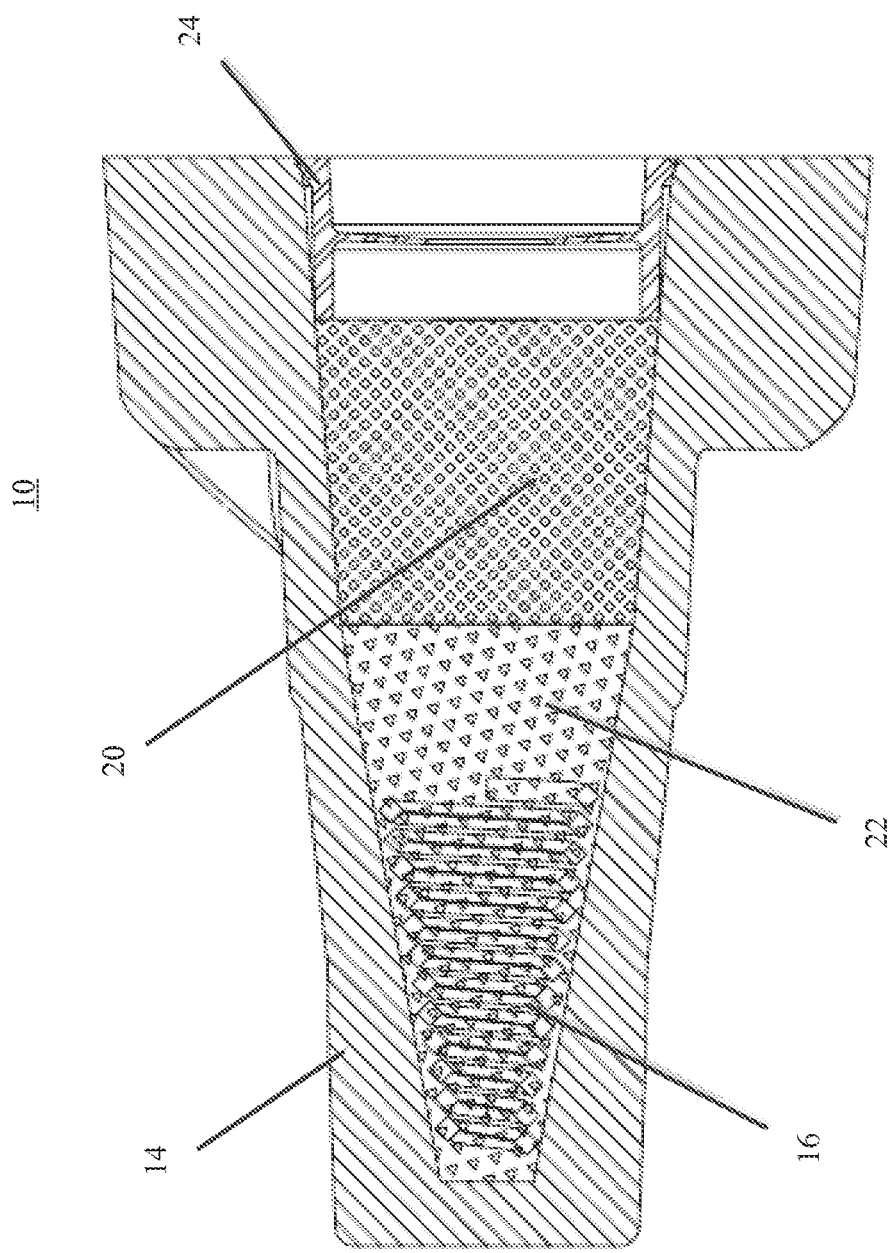
FIG. 1 illustrates a cross-sectional view of an exemplary, prefilled, twist-on electrical connector for use in electrically connecting a plurality of electrical conductors.

Turning now to the figures, wherein like elements are references using like identifiers, described hereinafter is a splice connector, in the exemplary form of a twist-on wire connector 10, for use in connecting a plurality of conductors 12, such as wires. To this end, the connector 10 comprises a housing 14, preferably constructed from an insulating, plastic material, in which is disposed a connecting element 16, such as a coil spring or the like. In the case of the twist-one wire connector, the connecting element 16 functions to twist the ends of the conductors 12 together and to grip the ends of the conductors 12 to thereby maintain the conductors 12 within the housing 14 when the connector 10 is rotated upon the ends of the conductors 12.

As further illustrated in the figures, the connector 10 is pre-filled with at least a first compound 20 and a second compound 22. The compounds are arranged in a corresponding plurality of layers and a barrier need not be provided between the first compound 20 and the second compound 22. Rather, a natural barrier that is formed by a reaction at the interface of the two compounds will be sufficient to maintain the compounds in the distinct layers.

In a preferred embodiment, the first compound 20 is a sealing compound. The sealing compound may be a silicone, a wax, a grease, or the like without limitation. Generally, the sealing compound is intended to perform the function of providing environmental protection to the conductors 12 when the connector 10 is applied thereto, e.g., to provide a water-proof barrier. Meanwhile, the second compound 22 is a conductive compound. The conductive compound may be a zinc particulate compound (such as Nolax®), an aluminum particulate compound, a ceramic particulate compound, or the like without limitation. The conductive compound is intended to perform the function of enhancing the electrical connection between the conductors 12 when the connector 10 is applied thereto.

Figure 2:
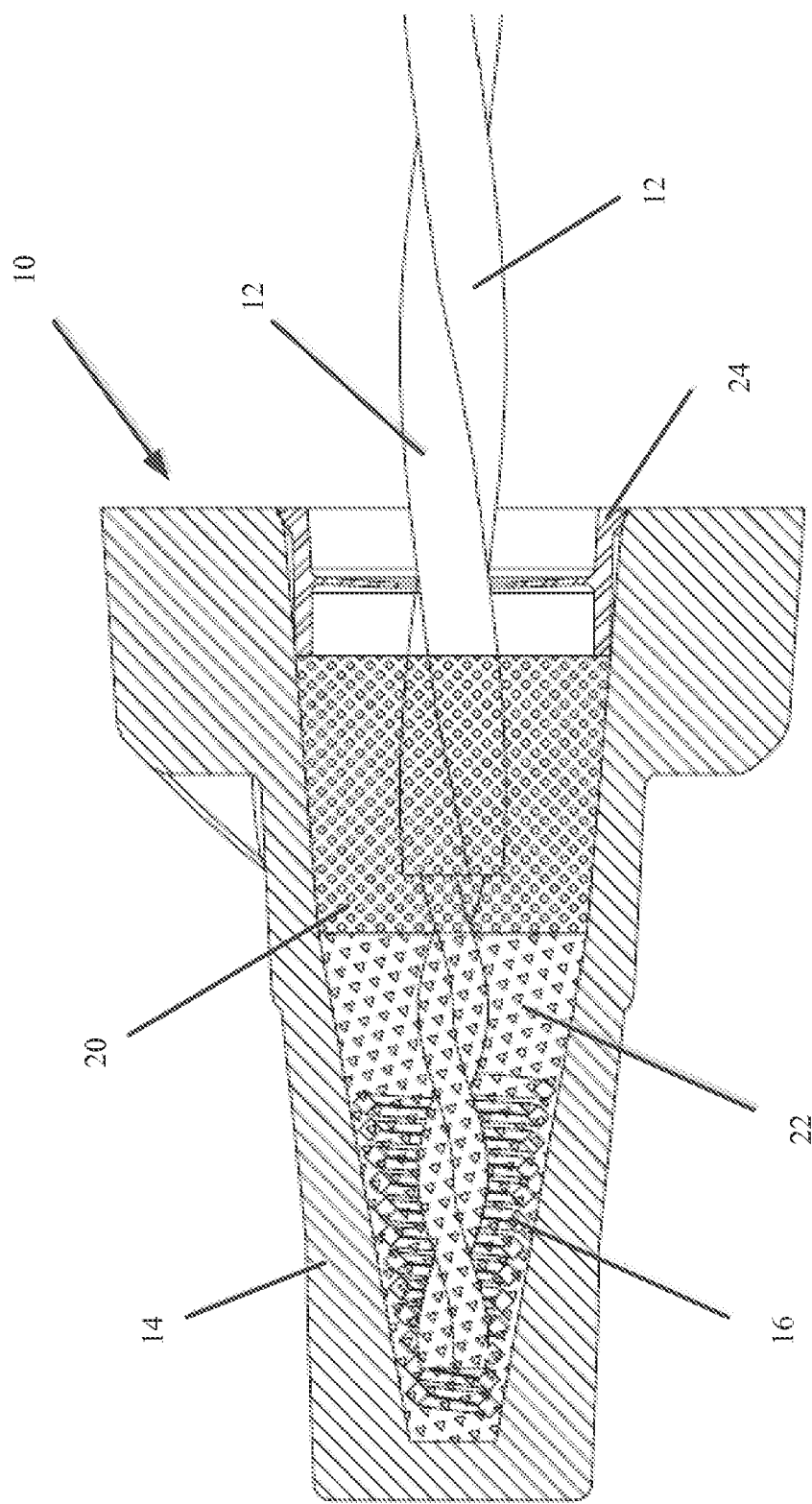
FIG. 2 illustrates a cross-sectional view of the electrical connector of FIG. 1 applied to a plurality of electrical conductors.

As particularly illustrated in FIG. 2, when the twist-on wire connector 10 is applied to the electrical conductors 12, the sealing compound 20 and the conductive compound will generally remain in the plurality of layers to thereby allow each of the compounds to perform their intended, different function. As also illustrated, in a preferred embodiment, the entirety of the connecting element 16 is positioned within the layer having the conductive compound while the layer having the sealing compound extends from the layer having the conductive compound to a location that is proximate to the conductor receiving opening of the housing 14.

For use in maintaining the compounds within the housing 14, the housing 14 may be provided with a cap 24. The cap 24 can be made to be removeable from the housing 14 (to thereby provide access to the conductor receiving opening) or can be affixed to the housing 14 as desired. If affixed to the housing 14, it will be appreciated that the cap 24 is to be provided with the conductor receiving opening (which opening may be provided with an optional, removeable cap or seal as desired).

While specific embodiments of the subject invention have been described in detail, it will be appreciated by those skilled in the art that various modifications and alternatives to those details could be developed in light of the overall teachings of this disclosure. It will therefore be appreciated that features described are not to be limited to any particular embodiment but may be freely used across embodiments where applicable. Additionally, it will be appreciated that the size, shape, arrangement, and/or number of components illustrated and described can be changed as necessary to meet a given need. Accordingly, the particular arrangements disclosed are meant to be illustrative only and not limiting as to the scope of the invention which is to be given the full breadth of the appended claims and any equivalents thereof.

What is claimed is:

1. An electrical connector, comprising:
   a housing;
   an electrical connecting element disposed within the housing; and
   a plurality of compounds arranged in a corresponding plurality of layers disposed within the housing wherein the plurality of compounds will generally remain in the plurality of layers to thereby allow each of the compounds to perform a different, intended function when the electrical connecting element is electrically coupled to a plurality of electrical conductors;
   wherein the housing has a sealed upper end and an opened lower end for receiving the plurality of electrical conductors;
   wherein the plurality of compounds comprise at least a sealing compound and a conductive compound and wherein the sealing compound forms a one of the plurality of layers that is positioned closest to the opened lower end of the housing and the conductive compound forms a one of the plurality of layers that is positioned in contact with the electrical connecting element;
   wherein the sealing compound comprises a wax material; and
   wherein the conductive compound is selected from the group consisting of a zinc particulate compound, an aluminum particulate compound, and a ceramic particulate compound.

2. The electrical connector as recited in claim 1, comprising a cap that is attached to the housing and arranged to seal at least in part the opened lower end of the housing.

3. The electrical connector as recited in claim 2, wherein the cap is releasably attached to the housing.

4. An electrical connector, comprising:
   a housing;
   an electrical connecting element disposed within the housing; and
   a plurality of compounds arranged in a corresponding plurality of layers disposed within the housing wherein the plurality of compounds will generally remain in the plurality of layers to thereby allow each of the compounds to perform a different, intended function when the electrical connecting element is electrically coupled to a plurality of electrical conductors;
   wherein the housing has a sealed upper end and an opened lower end for receiving the plurality of electrical conductors;
   wherein the plurality of compounds comprise at least a sealing compound and a conductive compound and wherein the sealing compound forms a one of the plurality of layers that is positioned closest to the opened lower end of the housing and the conductive compound forms a one of the plurality of layers that is positioned in contact with the electrical connecting element;
   wherein the sealing compound is selected from the group consisting of a silicone, a wax, and a grease; and
   wherein the conductive comprises a zinc particulate compound.

5. The electrical connector as recited in claim 4, comprising a cap that is attached to the housing and arranged to seal at least in part the opened lower end of the housing.

6. The electrical connector as recited in claim 5, wherein the cap is releasably attached to the housing.

7. An electrical connector, comprising:
   a housing;
   an electrical connecting element disposed within the housing; and
   a plurality of compounds arranged in a corresponding plurality of layers disposed within the housing wherein the plurality of compounds will generally remain in the plurality of layers to thereby allow each of the compounds to perform a different, intended function when the electrical connecting element is electrically coupled to a plurality of electrical conductors;
   wherein the housing has a sealed upper end and an opened lower end for receiving the plurality of electrical conductors;
   wherein the plurality of compounds comprise at least a sealing compound and a conductive compound and wherein the sealing compound forms a one of the plurality of layers that is positioned closest to the opened lower end of the housing and the conductive compound forms a one of the plurality of layers that is positioned in contact with the electrical connecting element;
   wherein the sealing compound is selected from the group consisting of a silicone and a grease; and
   wherein the conductive compound is selected from the group consisting of an aluminum particulate compound and a ceramic particulate compound.

8. The electrical connector as recited in claim 7, comprising a cap that is attached to the housing and arranged to seal at least in part the opened lower end of the housing.

9. The electrical connector as recited in claim 8, wherein the cap is releasably attached to the housing.

* * * * *